May 21, 1946. W. F. GAYRING 2,400,638
CABINET ENCLOSED PRESSING MACHINE
Filed April 24, 1943 5 Sheets-Sheet 1

INVENTOR
WALLACE F. GAYRING
BY Bodell and Thompson
ATTORNEYS

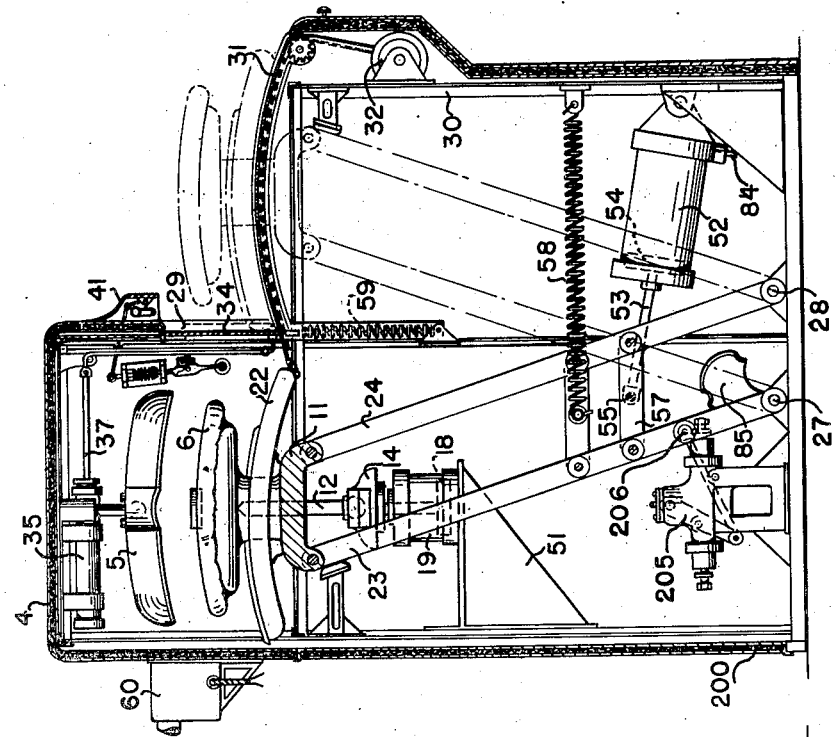
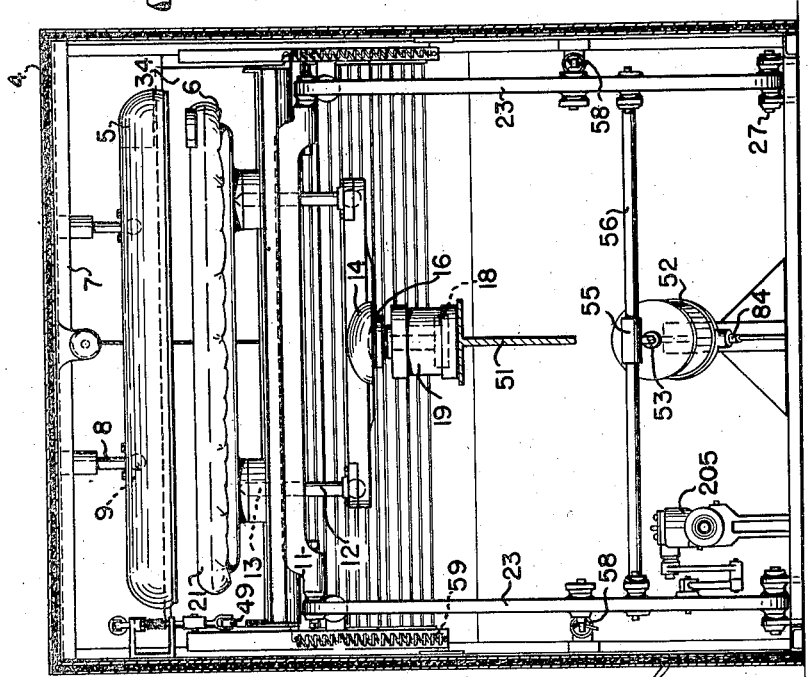

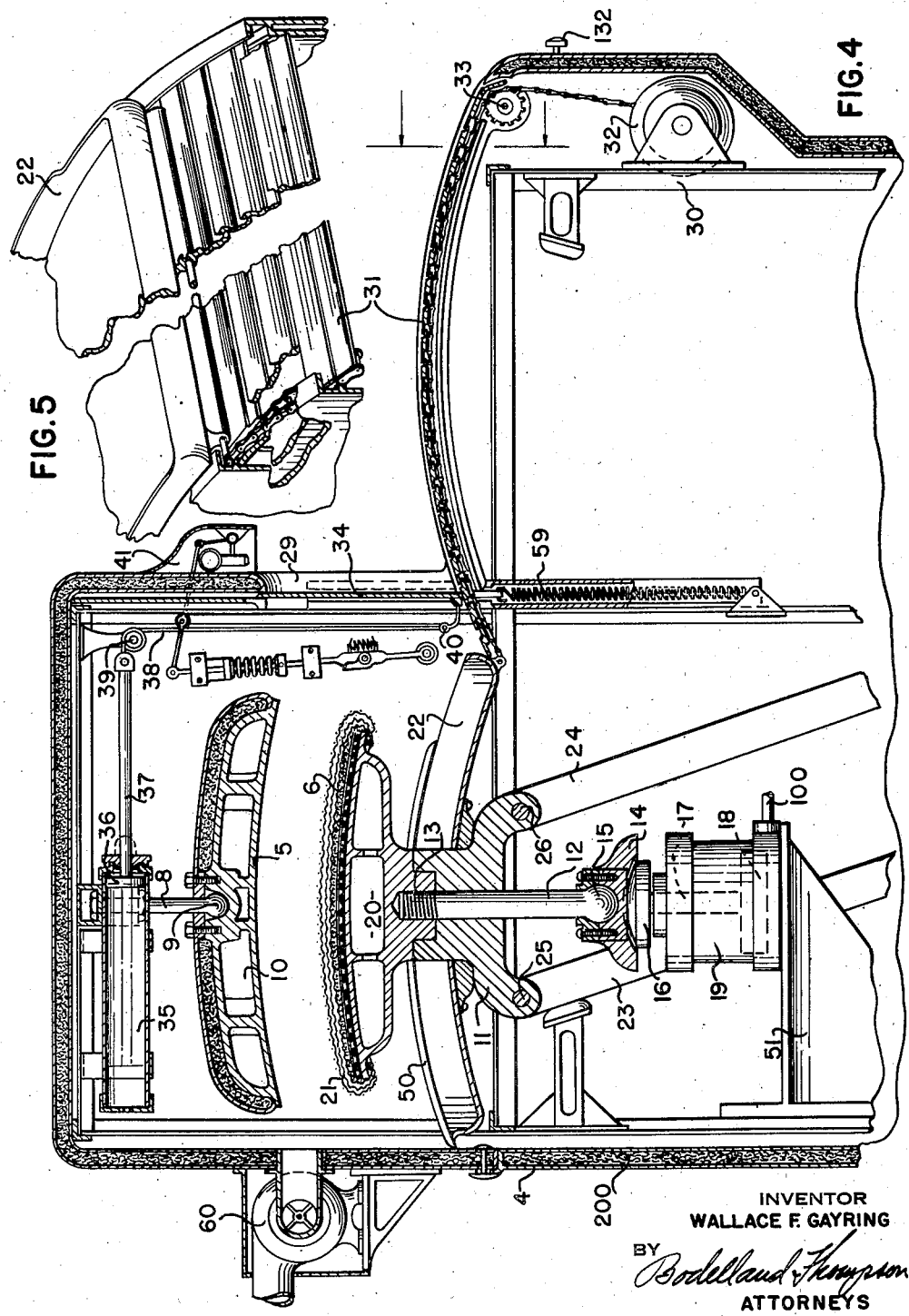

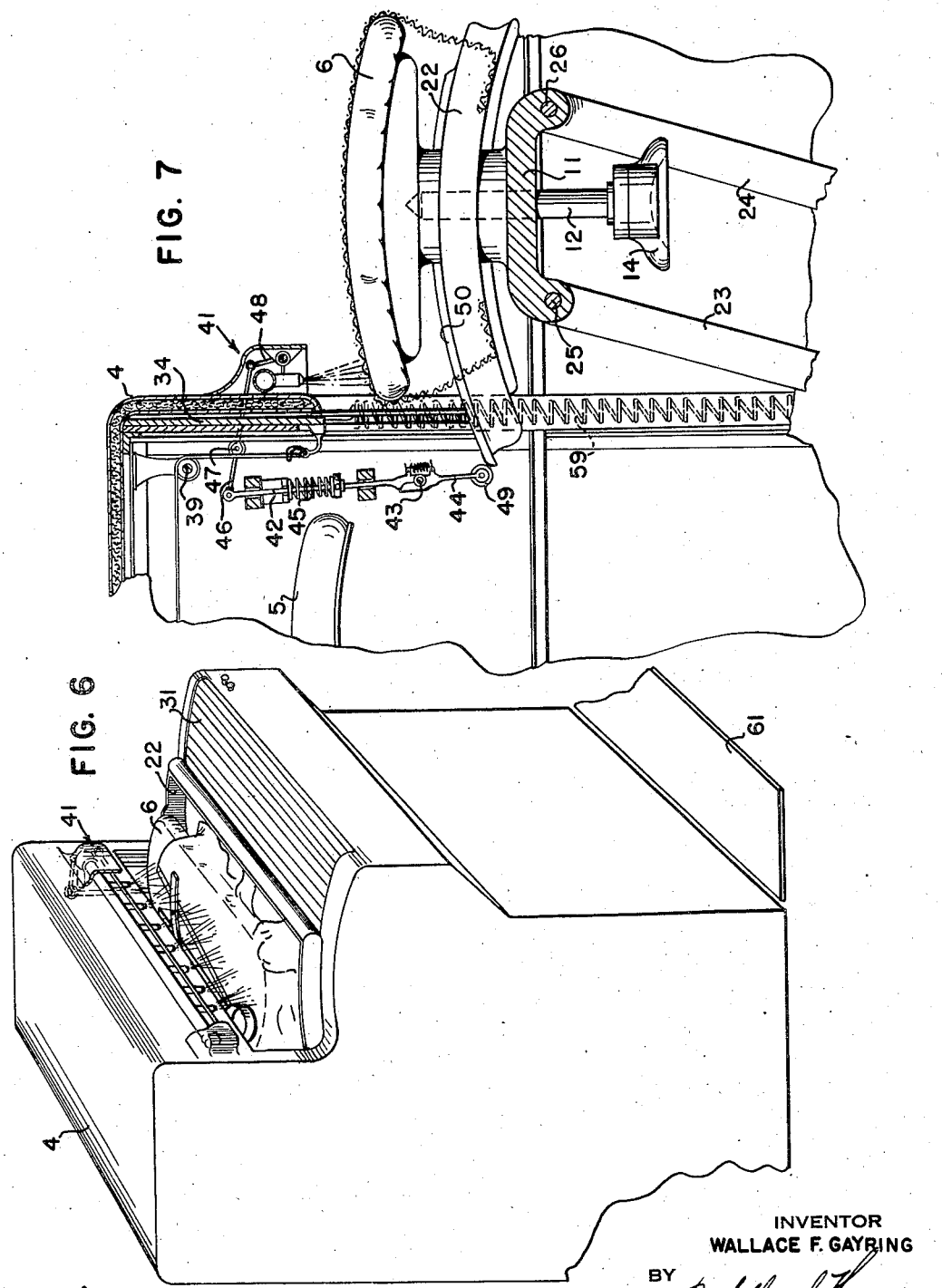

May 21, 1946. W. F. GAYRING 2,400,638
CABINET ENCLOSED PRESSING MACHINE
Filed April 24, 1943 5 Sheets-Sheet 5

INVENTOR
WALLACE F. GAYRING
BY Bodell and Thompson
ATTORNEYS

Patented May 21, 1946

2,400,638

UNITED STATES PATENT OFFICE 2,400,638

CABINET ENCLOSED PRESSING MACHINE

Wallace F. Gayring, Minoa, N. Y., assignor to The Prosperity Company, Inc., Syracuse, N. Y., a corporation of New York Application April 24, 1943, Serial No. 484,394

15 Claims. (Cl. 38—3)

This invention relates to fabric pressing machines, such as garment pressing machines, and is more particularly adapted to laundry pressing machines or machines wherein the operator does not hold onto the work during the pressing operation; and has for its object a cabinet enclosed machine, with the cabinet closed to the transfer of air from the interior thereof to the outer atmosphere in the room, in which the machine or machines are located, so that the machine may be located in an air-conditioned room, and the air condition maintained without being affected appreciably by the heat generated by the pressing machine or the outer air affected by the steam, moisture, vapors or fumes released by the heated pressing machine from the garment being pressed.

Some garments treated with chemicals release fumes during the pressing operation. These fumes are often injurious to the operator. This machine protects the operator from such fumes, both during manufacturing and laundering.

The invention further has for its object an operator controlled means for a press enclosed in a cabinet and having an opening and closing movement and having one of its pressing elements, as the lower element, movable into and out of the cabinet through an opening, which is opened and closed by a closure or door, operator controlled means operating to effect the operations in a predetermined order, as for instance, the closing of the press within the cabinet, the opening of the press, the transferring of the movable element to the outside of the cabinet and opening and closing the door prior to and after this transfer operation, the movement of the transferable element back into the cabinet with the new work laid thereon, the opening and closing of the door preliminary to and after the return movement of the lower pressing element back into the cabinet and finally the closing of the press.

The invention further has for its object means for applying water spray or moisture to the work, when on the lower pressing element, before the latter is in pressing position in the cabinet. This moistening or spraying mechanism is also controlled by an operator controlled means but is preferably directly controlled by the mechanism for transferring the lower pressing element out of and into the cabinet.

The invention further has for its object such a cabinet provided with suction means for withdrawing the heated and moist air therefrom, so that the draft, when the door is open, is always into the interior of the cabinet, to also prevent moisture from collecting on the interior of the cabinet and to prevent the already ironed portions from breaking down.

The invention consists in the novel features and in the combinations and constructions hereinafter set forth and claimed.

In describing this invention, reference is had to the accompanying drawings, in which like characters designate corresponding parts in all the views.

Figures 2 and 3 are sectional views looking forwardly from the rear of the machine and laterally from one side of the machine respectively.

Figure 4 is an enlarged, fragmentary, cross-sectional view showing the lower pressing element in place under the upper heated pressing element in position to be moved upwardly into pressing coaction therewith, the insulating construction of the cabinet being also shown.

Figure 5 is a fragmentary perspective view illustrating primarily the flexible curtain or roll top movable with the lower pressing element during its movement into and out of the cabinet, in order to close the front portion of the cabinet in which the mechanism for the lower pressing element moves, when the lower pressing element is out of the cabinet, the curtain being normally closed.

Figure 6 is a fragmentary perspective view showing the spraying device and the operation thereof.

Figure 7 is a fragmentary sectional view showing the spraying device and the control thereof by the opening of the door in the cabinet, which controls the opening through which the lower pressing element moves into and out of the cabinet, the door being normally closed.

Figure 1:
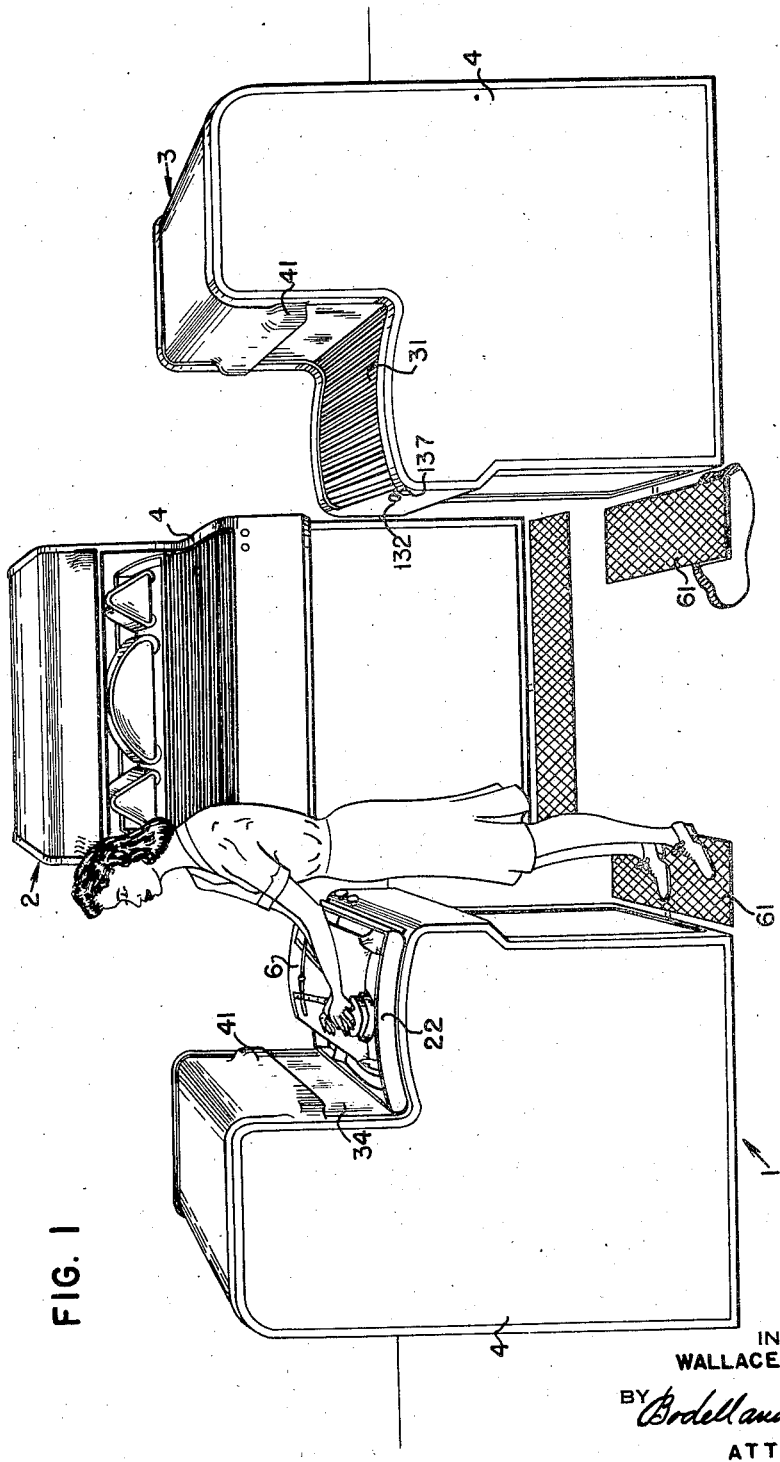
Figure 1 is a perspective view showing three of these cabinet enclosed machines for air-conditioned laundries, the machines being a battery of machines, used for instance, in pressing a particular article, as a shirt, one machine being adapted to press the body of the shirt, another to press the collar or yoke and the cuffs, and the third machine may be to press the sleeves.

This pressing machine comprises, generally, co-operating pressing elements having an opening and closing movement, at least one of said elements being heated, an insulated cabinet entirely enclosing the machine, so as to confine the heat generated by the machine within the machine, and also confine any gases or fumes that in some instances might be formed, to within the machine during the pressing or processing operation of the garment, which gases might be injurious to the operator. One of the elements, as the lower pressing element on which the work is placed, is shiftable or transferable out of and into the cabinet for the purpose of removing the finished work therefrom and placing the new work thereon, the cabinet being formed with a door opening through which the lower element transfers out of and into the cabinet, a door operable to close said opening, and operator controlled means for controlling the operation of power mechanisms which effect the opening and closing of the press, the movement of the lower element out of and into the cabinet, the opening and closing of the door, and the timing of these operations to open the door, when the transferable element is being transferred out of the cabinet and close the same, after it has passed through the door, and also to open the door, when the lower pressing element with the work thereon is being moved back into the cabinet and closing the door after the said element has passed into the cabinet.

The machine further includes means for spraying or moistening the work on the lower pressing element, as the lower pressing element is returning into the cabinet through the open door, the spraying or moistening means being controlled in its operation by the mechanism for transferring the lower element out of and into the cabinet.

The pressing machine may be of any suitable type including coacting pressing elements, one of which is movable toward and from the other. In garment pressing machines, these elements are usually upper and lower pressing elements, and usually the upper pressing element or head is movable toward and from the lower pressing element or buck. In this embodiment of the invention, the lower pressing element or buck is movable toward and from the upper pressing element during the closing and opening of the press. The pressing elements may be of any desired form, and in Figure 1, a battery of three machines is shown, each with pressing elements of different character, but in so far as this invention is concerned, all the machines of the battery are of the same general construction, except for the shapes of their pressing elements.

1, 2 and 3 designate the cabinet machines respectively. Each machine includes a cabinet 4 which entirely surrounds it, and this cabinet may be, as seen in Figures 2, 3 and 4, of special or double-wall construction to insulate the same, the insulation being designated 200. 5 and 6 designate coacting pressing elements, as upper and lower pressing elements, those here shown being of the platen type, and the upper element or head 5 being supported from a suitable frame 7 in any suitable manner, as by hangers 8, which are connected at spaced apart points to the element 5 by universal or compensating joints 9. The upper pressing element is preferably formed with a heating chamber 10 to which a heating medium, as steam, etc., is supplied in any well known manner. The lower pressing element or buck 6 is mounted to move vertically into and out of coaction with the upper pressing element 5. It is here shown as mounted on a base 11 to be shifted relatively thereto and is moved vertically by push rods or stems 12 slidable through the base and secured at 13 to the lower pressing element 6 at spaced apart points, these stems or push rods 12 being connected to an equalizing bar 14 by universal joints 15, said equalizing bar 14 coacting between its ends with actuating mechanism, as the head 16 on a piston rod 17 of a piston 18, which works in a cylinder 19. The lower pressing element or buck 6 is also chambered at 20 for receiving a heating medium or means to dry the padding 21 on its pressing face in any well known manner. A table 22 on which the work overhanging from the lower pressing element rests, is also carried by the base 11. The mechanism for moving the lower pressing element or buck 6 into and out of the cabinet may also be of any suitable construction. This is power actuated and includes a pair of upright parallel links 23, 24 secured at their upper ends at 25 and 26 to each end of the base 11 and at their lower ends at 27 and 28 to the frame of the machine within the cabinet. These links 23, 24 have a fore-and-aft swinging movement about their pivots 27 and 28 and in so doing, carry the lower pressing element or buck 6 from the full line position to the dotted lines position (Figure 3), or to the full line position (Figure 7), the buck 6 moving generally horizontally. During this movement, it moves through a door opening 29 in the front wall of the cabinet. In order to accommodate the links 23, 24 during their swinging movement, the cabinet has a lower forwardly extending portion 30 (Figure 3) of less height than the rear portion. This lower portion would ordinarily be open at its top, but the open top is closed, when the lower pressing element or buck is within the cabinet by a flexible curtain 31 which rolls on a spring roller 32 within said portion 30 of the cabinet, which also extends around a guide roller 33, the curtain 31 being connected at its rear end to the table 22, so that it opens and closes the upper end of the front extension 30 of the cabinet, when the lower pressing element or buck 6 moves out of the cabinet and returns back into the cabinet. The curtain thus keeps any heat and any atmosphere within the cabinet from escaping to the room outside of the cabinet.

The door opening 29 is also closed by a door 34, which is movable vertically, it being power operated, as by a cylinder and piston 35, 36 mounted in the top portion of the cabinet, the piston rod 37 being connected by a cable 38 which runs over a pulley 39 and which is also connected at 40 to a bracket at the lower edge of the door 34. This actuating mechanism will be hereinafter referred to in connection with the operation of the machine.

In order to facilitate the ironing and effect uniform ironing, the garments are moistened instead of relying upon the moisture in the garment, when they come from the extractor. Because of extractor wrinkles, the moisture is not evenly distributed, and therefore by this machine, the articles being pressed are moistened uniformly or may be rough-dried and moistened preliminarily to pressing, so that the moisture will be distributed equally throughout the wrinkles.

41 designates the spraying device (Figures 6, 7) which extends across the upper edge of the door opening 29 on the front side thereof with jets directed downwardly, this being connected to a suitable source of water or steam. It is controlled by a valve operated by means which is operable by the return movement of the lower pressing element or buck 6 into the cabinet. This means is here shown (see Figure 7) as a slide 42 located within the upper portion of the cabinet and jointed at 43, so that the lower portion 44 has a ratcheting movement about the pivot 43 to the right and is prevented from pivotal movement to the left (Figure 7). The pivotal movement of the lower portion 44 about the pivot 43 to the right is against the action of a returning spring. The slide or rod 42 moves upwardly against the action of a spring 45 and is connected at its upper end to a lever 46 pivoted at 47 between its ends and having its front end connected to a valve opening lever arm 48. The pivoted arm of the slide or rod 42 has a follower 49 for coacting with a cam 50 on the table 22. When the lower pressing element or buck 6 and the table 22 are moving out of the cabinet through the door opening 29, the follower 49 coacts with the cam, but the arm 44 ratchets to the right about its pivot, and hence does not lift the slide or rod 42 upwardly against the spring 45. When, however, the lower pressing element or buck 6 and the table 22 return into the cabinet, the roller now again engages the cam 50, but the arm 44 is prevented by the stop joint from pivoting to the left, so that the rod or slide 42 is cammed upwardly against the spring 45, moves the lever 46 on its pivot and thus actuates the valve opening lever arm 48 to open the valve, permitting the moisture to spray from the device 41 onto the work on the buck 6 as the buck 6 is returning into the cabinet.

The power means for opening and closing the press includes the cylinder 19 and piston 18 previously referred to coacting with the rod or ram 12, this cylinder being mounted upon a shelf 51 within the cabinet and the motive fluid, as compressed air, is supplied thereto, as will be hereinafter described.

The power means for actuating the lower pressing element or buck 6 to transfer it out of and into the cabinet comprises a cylinder 52 mounted in the front portion 30 of the cabinet and having a rod 53 of its piston 54 connected at 55 to a cross bar 56 between the links 57 connecting each of the links 23, 24. The piston 54 is single acting and operates to return the lower pressing element or buck into the cabinet against the action of a suitable spring 58, which acting on the links 23, 24, moves the buck 6 out of the cabinet, when the air is free to exhaust from the cylinder 52. A hydraulic check designated as 205 connected to link 23 at 206 prevents violent motion of the buck 6 in both directions.

The power means for the door 34 consists of the cylinder 35 and the piston 36 previously described. This is also a single acting piston, and when energized, tends to open the door. When the air is free to exhaust from the cylinder 35, the door is closed by springs 59. During the operation of the machine, an exhausting device, as a blower 60, the intake side of which is connected to the interior of the cabinet evacuates the heated moist air, gases and fumes from the interior of the cabinet to outside the room, so that whenever the door 34 is opened, the draft is always inward and the outside air-conditioned air is not affected nor is the operator subject to any heat or fumes that may be released within the cabinet. Thus, by means of this machine, an air-conditioned room may be kept air-conditioned or at a predetermined temperature economically, and also any fumes injurious to the operator are prevented from passing the cabinet to the room.

The operator controlled means for controlling the operation of the power means and the sequence of operations thereof will now be described.

The operation of the machine may be controlled in any one of various ways, but as the opening and closing operations take place away from the operator and within a closed cabinet, a safety or two hand control is not necessary. The control mechanism here shown embodies a manual control and also a pedal control, or what might be analogous to a pedal control, that is, a control operated by the weight of the operator or by the operator stepping on a plate or mat in front of the machine, another phase of such control being a control operated by the presence or absence of the operator in the working zone of the machine. As the moving parts of the machine are pneumatically operated, the controls are preferably pneumatic and operated to control the flow of motive fluid, as compressed air, to and from the cylinders 35, 19 and 52. The operating mechanism also includes a pneumatic timer, which automatically serves to open the press, after it has been closed a predetermined time, regardless of the presence of the operator.

Assuming that the parts are in the position shown in broken line in Figure 3, or in full lines in Figure 7 or in Figure 1, and that the operator has laid the work on the lower pressing element or buck 6, the operator steps off the mat 61 after laying the work on the buck 6. While standing on the mat 61, the mat is compressed, expelling air from the internal chamber 62 in the mat through a pipe 63 to a bellows 64, which closes a needle valve 65 in a pipe leading from a tank 66, the needle valve 65 being connected by a pipe 67 to a diaphragm chamber 68, the diaphragm 69 of which operates, through a plunger 70, a lever 71, which in turn closes the exhaust valve head 72 and opens an intake valve head 73 of a combined intake and exhaust valve 74, the intake end of which is connected through a pipe 75 to a feed pipe 76. The outlet pipe 63 from the mat 61 is also connected by a pipe 77 to a bellows 78 which operates a similar combined intake and exhaust valve 79 to open the intake valve head 80 thereof and close the exhaust valve head 81, the casing of the valve 79 communicating through a pipe 82 having a check valve 83 therein with the tank 66. Thus, while the operator is standing on and compressing the mat 61, the needle valve 65 is closed, and hence the valve 74 is closed, but the valve 79 is open, permitting air to charge into the tank 66. The valve 74 communicates through a pipe 84 with one end of the cylinder 52. Thus, when the operator steps off the mat 61, the needle valve 65 opens and the valve 79 closes. The opening of the needle valve permits the air from the tank 66 to operate the diaphragm 69 to open the intake head 73 of the valve 74 and close the exhaust head 72, so that air can flow from the main line 76 through pipe 75, casing of the valve 74, and pipe 84 to the cylinder 52 to actuate the piston 54 therein, and hence through the piston rod 53 to swing the carrying mechanism for the lower pressing element or buck 6, including the links 23, 24, from the position shown in dash lines in Figure 3 to the position shown in full lines, wherein the buck 6 is under the head 5.

The door 34 is controlled in the opening and closing thereof to permit the buck 6 to pass into the cabinet and close after the buck has passed into the cabinet in any suitable manner, as by a cam 85 (see Figures 3 and 8) movable with the links 23, 24, and here shown as carried by one of them, as 23, and coacting with a follower 86 on the stem 87 of a combined intake and exhaust valve 88, to close the normally open exhaust valve head 89 and open the intake valve head 90, upon the initial swinging movement of the links from their forward position, and also upon the initial movement of the links from their rearward position, the cam being provided with dwell portions, as 91, 92, at the end of its lift portion 93. Upon the initial movement of the links 23, 24 under the impulse of the piston 54, the follower 86 is carried up out of the dwell portion 91 onto the lift 93, thus closing the exhaust head 89 and opening the intake head 90 of valve 88, and this permits air to flow from main feed line branch 94 through pipe 95, through a control check valve 96, and thence through pipe 97 to one end of the cylinder 35, thus actuating the piston 36 to open the door 34, and when the buck 6 and the carrier mechanism including links 23, 24 have moved into the full line position (Figure 3) or into the position shown in Figure 4, the follower 86 moves into the dwell portion 92, again opening the exhaust valve head 89 and closing the intake valve head 90 of the valve 88, permitting the air to exhaust from the cylinder 35, back through the pipe 95, control check, that is, a check with a by-pass around it at 96, pipe 97, past the open exhaust valve head 89 of the valve 88, the door returning to closed position under the influence of its spring 59. The air now flows to the cylinder 19 for moving the buck 6 upwardly against the head 5 and the flow of air to the cylinder 19 is controlled as follows: From main line branch 98 through casing of intake and exhaust valve 99, pipe 100 to the cylinder 19. The valve 99 is normally arranged with its intake valve head 101 closed and its exhaust valve head 102 open. This valve is timed and operated through a door controlled combined intake and exhaust valve 103 arranged with its exhaust valve head 104 closed and its intake valve head 105 open, when the door 34 is closed. The intake end of the casing of the valve 103 is connected by a pipe 106ª to a port 106 in the side of the cylinder 52 located to be uncovered by the piston 54, when the piston approaches the end of its power stroke, which is when the buck 6 is under the head 5, or in the position shown in full lines (Figures 3 and 4).

There is a choke or orifice 107 in the pipe 106ª. When the piston 54 uncovers the port 106, the air from the cylinder 52 also passes through the pipe 106ª through the valve 103, the intake head of which is opened, because the door 34 is closed, thence through pipe 108 to diaphragm chamber 109, operating the diaphragm 110 therein, which in turn through a plunger and lever mechanism 111, closes the exhaust valve head 102 and opens the intake valve head 101 of the valve 99 to permit the air to flow to the cylinder 19 and thus close the buck 6 against the head 5.

Figure 8:
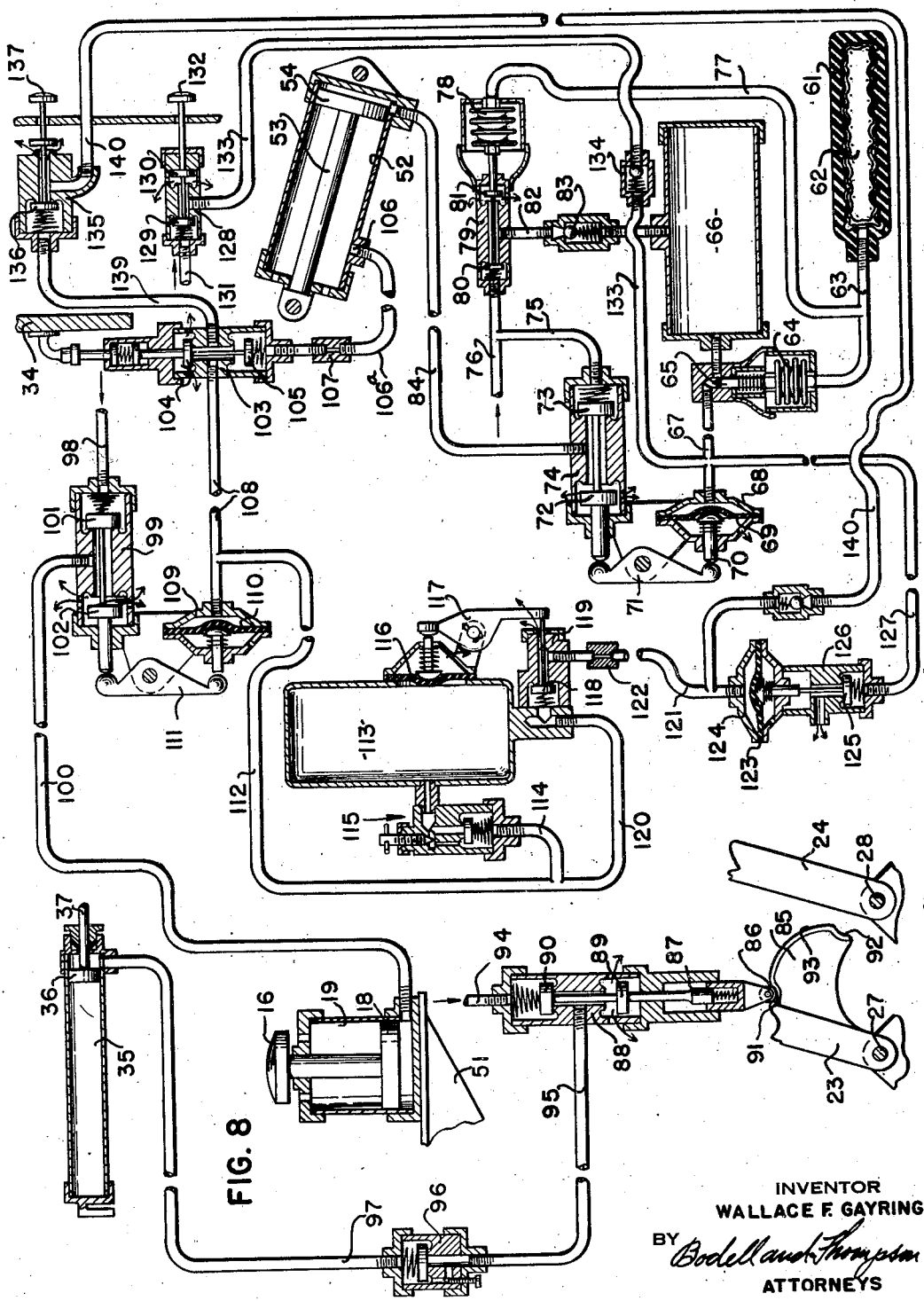
Figure 8 is a diagrammatic view of the power operated mechanisms and the controls for opening and closing the press, opening and closing the cabinet thereof, and for operating the lower pressing element out of and into the cabinet and controlling the sequence of operations of these mechanisms.

Preferably, a timer is employed to automatically open the press. When the air passes through the pipe 108, which occurs after the piston 54 uncovers the port 106, it also passes through pipe 112 to a timer tank 113, the air flowing from the pipe 112 to the tank 113 through a branch pipe 114 having a bleeding check valve 115 therein, which in effect is a timer valve, which determines the rate at which the air is admitted to the tank 113 and builds up sufficient pressure therein to cause the machine to open. Hence, a predetermined pressure in the tank 113 operates a diaphragm 116, which in turn through suitable levers 117, opens a normally closed valve head 118 of a valve 119, said valve being in communication with the pipe 112 through a by-pass 120. When the valve head 118 is opened, air passes through the valve 119, pipe 121 having a choke or orifice 122 therein and operates a diaphragm 123 in the chamber 124, which diaphragm opens a normally closed exhaust valve head 125 of a valve 126, which is connected by a pipe 127 to the pipe 67 and acts to exhaust air from the diaphragm chamber 68 through the release valve 126. The exhausting of air from the diaphragm chamber 68 causes the intake valve head 73 to close and the exhaust valve head of the valve 74 to open, thus exhausting the air from the cylinder 52. The orifice 122 serves to delay the opening of the valve 74 until the air is exhausted from the cylinder 19 through valve 99 which opens immediately upon the release of the air through the exhaust valve 119, as indicated by the exhaust arrows (Figure 8). The air releases through pipe 120 permitting diaphragm 110 to release the valve 99 and permitting the intake valve 101 to close and the exhaust valve 102 to open, and assures that the buck 6 is released from the head 5 before the cylinder 52 has been released and the buck 6 starts to transfer out of the cabinet.

The machine, as here shown, is provided with a manual means for controlling the closing of the press, and also means for opening the press independently of the timer. The manual means for controlling the closing of the press, as here shown, includes a combined intake and exhaust valve 128 normally arranged with its intake head or button 129 closed and its exhauset valve head 130 open. The intake end of the casing of the valve 128 is connected to a branch feed line 131. This valve is operated by a manual or push button 132 conveniently mounted on the frame of the machine. Upon the operation of the push button 132, the intake 129 will be opened, and the exhaust 130 closed, so that air passes from the main line 131 through the casing of valve 128, pipe 133 to the diaphragm chamber 68 to operate through the levers 71, the combined intake and exhaust valve 74 which controls the flow of air to the cylinder 52, as heretofore described, independently of the mat 61, valve 79, tank 66, etc.

The operation of the machine, when operated with the manual, is the same as when operated with the mat, after the cylinder 52 has been energized.

The pipe 133 has a suitable check valve 134 therein, so that air pressure from the tank 66 will not be lost out past the normally open exhaust valve 130.

The machine may be operated at any time independently of the timer, or the timer may be omitted. This operation includes a manually operable release valve 135 operable to apply pressure to the diaphragm chamber 124 before the pressure has built up in the timer tank 113 sufficient to operate the valve 119 through the diaphragm 116 of the timer. The valve 135 has a normally-closed, intake valve head 136, which is operated to open position by means of a button 137 suitably located on the machine. The intake end of the valve casing 135 is connected by a pipe 139 to the casing of the valve 103, this being the valve that is held opened by the door 34, when the door is closed. The door is closed only when the buck is in the cabinet or out of the cabinet. However, the valve 103 is only effectively open, when the buck is in the cabinet and the piston 54 of the cylinder 52 has passed the port 106. When this port 106 has been so passed, the air in passing through the valve 103 to the diaphragm chamber 109 to open the valve 99 to the intake of air, which controls the flow of air to the cylinder 19. The air also passes from the valve 103 through the pipe 139 to the valve 135. Hence, when the press is closed, operating of the push button 137 to open the valve head 136 permits the air to pass from the pipe 139 through the casing of valve 135 through pipe 140 to the pipe 121, and thence to the diaphragm chamber 124 to actuate the diaphragm therein, and open the release valve head 125, which will cause the air to be exhausted from the diaphragm chamber 68, which holds the control valve 74 for the piston 52 with its intake valve head open. Hence, this valve 74 now closing the intake valve head opens the exhaust valve head and will cause the air first to exhaust from the cylinder 19 and the press to open, and then to exhaust from the cylinder 52 and the buck to swing from in the cabinet out of the cabinet.

When the pressure builds up in the timer cylinder 113 sufficient to open the valve head 118 of the valve 119, the air then exhausts from the diaphragm chamber 109 through pipes 108, 112, 120 and valve casing 119. The air exhausting from the diaphragm chamber 109 permits the intake valve head 101 of valve 99 to close and the exhaust valve 102 to open, thus permitting the cylinder 19 to exhaust back through the pipe 100, valve casing 99 through open exhaust valve head 102 to the outer air, as indicated by the arrows. At the same time, air or a strong puff of air passes through the orifice 122 to the diaphragm chamber 124, depressing the diaphragm to open the valve head 125 of valve 126, so that the air exhausts from diaphragm chamber 68, permitting the intake head 74 of valve 74 to close and the exhaust valve head 72 to open. Hence, air can now exhaust from the cylinder 52 back through the pipe 84, valve casing 74 and out through the exhaust passages, as indicated by the arrows. This permits the spring 58 to re-act and pull the lower buck out of the cabinet into the dotted line position (Figure 3), but after the buck has been shifted downwardly from out of pressing engagement, due to the delaying action of the orifice 122. The valve 119 is vented or bleeded along its stem to the outer air. The bleeding is at a much slower rate than the puff of air feeds through the orifice 122. This vent or bleeder also vents or bleeds the diaphragm chamber 124. The orifice 122 is therefore such that the air passes to the diaphragm chamber 124 and builds up the pressure therein faster than the air exhausts from the valve 119 along the stem of the valve head 118, where indicated by the arrows. Upon the initial movement of the piston 54 in the cylinder 52 to the left (Figure 8), the cam 85 on the buck carriage link 23 opens the intake head 90 of the valve 88, permitting air to pass to the door opening cylinder 35 and actuate the piston 36 to open the door 34. When the buck has passed through the door opening, the cam 85 closes the intake valve head 90 and opens exhaust valve head 89 of valve 88 de-energizing cylinder 35, permitting the door 34 to be closed by its spring 59. The closing of the door 34 closes exhaust valve head 104 and opens intake valve head 105 of valve 103, permitting air to pass from the cylinder 52 through the port 106, pipe 106ª, orifice 107, valve 103, pipe 108 to the diaphragm chamber 109 to open the valve head 101 and close exhaust valve head 102 of the valve 99, controlling the operation of the cylinder and piston motor 19, 18 which moves the buck 6 into pressing coaction with the head 5. The port 106 is passed by the piston 54 when the piston approaches the end of its power stroke in moving the buck 6 under the head 5. The orifice 107 delays the opening of the valve 103 to the passage of air to the operating diaphragm chamber 109 for the control valve 99 of the cylinder and piston motor 19, 18 a sufficient time to permit the piston to come to rest during and after uncovering the port.

All the valves, such as the valves 74, 79, 88, 99, 128 and 135 are self-returning or spring-pressed.

What I claim is:

1. In a fabric pressing machine, cooperating pressing elements having an opening and closing movement, at least one of said elements being heated, a cabinet entirely enclosing the machine, one of the elements being transferable out of and into the cabinet for placing the work on and removing the same therefrom, the cabinet being formed with a door opening through which the transferable element moves out of and into the cabinet, a door operable to close said opening, mechanisms for supporting said elements and the door and for operating the press to open and close the same, actuating the transferable element out of and into the cabinet and for opening and closing the door, and operator controlled means common to the operating mechanism for controlling and timing the closing and opening of the press, the shifting of the transferable element out of and into the cabinet and the opening of the door prior to the movement of the transferable element out of and back into the cabinet and the closing of the door when the transferable element is in the cabinet and when out of the cabinet.

2. In a fabric pressing machine, cooperating pressing elements having an opening and closing movement, at least one of said elements being heated, a cabinet entirely enclosing the machine, one of the elements being transferable out of and into the cabinet for placing the work on and removing the same therefrom, the cabinet being formed with a door opening through which the transferable element moves out of and into the cabinet, a door operable to close said opening, power means to open and close the press, open and close the door, and to operate the transferable element out of and into the cabinet, and operator controlled means common to all of the power means for controlling and timing the operation of said power means to close and open the press, open the door after the opening of the press, transfer the transferable element out of the cabinet through the open door, and close the door, and to effect the operation of said power means in the reverse order, when the transferable element starts from the outside of the cabinet to the inside thereof.

3. In a fabric pressing machine, cooperating pressing elements having an opening and closing movement, at least one of said elements being heated, a cabinet entirely enclosing the machine, one of the elements being transferable out of and into the cabinet for placing the work on and removing the same therefrom, the cabinet being insulated and formed with a door opening through which the transferable element moves out of and into the cabinet, a door operable to close said opening, mechanisms for supporting said elements and the door and for operating the press to open and close the same, actuating the transferable element out of and into the cabinet and for opening and closing the door, and operator controlled means common to the operating mechanism for controlling and timing the closing and opening of the press, the shifting of the transferable element out of and into the cabinet and the opening of the door prior to the movement of the transferable element out of and back into the cabinet and the closing of the door when the transferable element is in the cabinet and when out of the cabinet, and means for maintaining the atmospheric pressure within the cabinet below that outside of the cabinet.

4. In a fabric pressing machine, cooperating pressing elements having an opening and closing movement, at least one of said elements being heated, a cabinet enclosing the machine, one of the elements being transferable out of and into the cabinet for placing the work on and removing the same therefrom, the cabinet being formed with a door opening through which the transferable element moves out of and into the cabinet, a door operable to close said opening, power means to open and close the press, open and close the door, and to operate the transferable element out of and into the cabinet, and operator controlled means for controlling the operation of said power means to close and open the press, open the door after the opening of the press, transfer the transferable element out of the cabinet through the open door, and close the door, and to effect the operation of said power means in the reverse order, when the transferable element starts from outside of the cabinet to the inside thereof, and suction means for removing the air from the cabinet, whereby, when the door is open, the draft is inward through the door and heated air, fumes or moisture from within the cabinet are prevented from passing outside of the cabinet.

5. In a fabric pressing machine, cooperating pressing elements having an opening and closing movement, at least one of said elements being heated, an insulated cabinet enclosing the machine to confine the air heated by the machine, one of said elements being transferable out of and into the cabinet for placing the work on and removing the same therefrom, the cabinet being formed with a door opening through which the transferable element moves out of and into the cabinet, a movable door operable to close said opening, mechanism for supporting the transferable element and movable beyond the plane of said door opening, when the transferable element is out of the cabinet, and thereby opening a portion of the cabinet when the transferable element is shifting and is shifted out of the cabinet, and a curtain connected to the transferable element to be operated thereby to close said portion of the cabinet in which the supporting mechanism works, when the transferable element has been shifted into the cabinet.

6. In a fabric pressing machine, cooperating pressing elements having an opening and closing movement, at least one of said elements being heated, an insulated cabinet enclosing the machine to confine the air heated by the machine, one of said elements being transferable out of and into the cabinet for placing the work on and removing the same therefrom, the cabinet being formed with a door opening through which the transferable element moves out of and into the cabinet, a movable door operable to close said opening, power operated mechanisms for opening and closing the press, opening and closing the door, and for moving the transferable element out of and into the cabinet through the door opening, means for applying moisture automatically to the work on the transferable element, when the transferable element is moving into the cabinet, means controlled by the movable mechanism supporting the transferable element for controlling the operation of said moistening means, and operator controlled means for controlling the operation and sequence of operations of said power mechanisms.

7. In a fabric pressing machine, cooperating pressing elements having an opening and closing movement, at least one of said elements being heated, an insulated cabinet enclosing the machine to confine the air heated by the machine, one of said elements being transferable horizontally out of and into the cabinet for placing the work on and removing the same therefrom, the cabinet being formed with an upright door opening through which the transferable element moves out of and into the cabinet, a movable door operable to close said opening, power mechanisms for opening and closing the pressing elements, for opening and closing the door and supporting and moving the transferable element out of and into the cabinet, the cabinet including a portion in which the mechanism for the transferable element moves, when the transferable element is out of the cabinet, said portion being open at its top, a curtain for closing the open top of said cabinet portion and being connected to the transferable element to be opened and closed thereby during the movement of the transferable element out of the cabinet and back into the cabinet respectively.

8. In a pressing machine or the like including cooperating pressing elements, at least one of which is heated, a cabinet enclosing the machine, mechanism for operating the pressing elements to open and close the press and for transferring one element out of and into the cabinet, when the press is open, closure means normally in closed position to prevent the escape of heat, moisture and fumes from the cabinet when the transferable pressing element is in or out of the cabinet, means for opening the closure means during the movement of the transferable element out of and into the cabinet, power means for effecting the opening and closing of the press, the movement of the transferable element and the operation of the closure means in a predetermined sequence, and control means for controlling the operation of the power means including operator-operated means, upon one operation of which the power means performs the operation of opening the press, opening the closure means, transferring the transferable element out of the cabinet and closing the closure means, and upon the next operation, the power means performs the operations in the reverse order.

9. In a fabric pressing machine, cooperating pressing elements having an opening and closing movement, at least one of said elements being heated, a cabinet enclosing the machine, one of said elements being transferable out of and into the cabinet for placing the work on and removing the same therefrom, the cabinet being formed with an opening through which the transferable element moves into and out of the cabinet, mechanisms for supporting the said elements and for operating the press to open and close the same and actuating the transferable element out of and into the cabinet, and operator controlled means common to said operating mechanisms, and closure means operable in synchronism with the transferable element for closing the cabinet against outlet of air from within the cabinet when the transferable element is out of and in the cabinet.

10. In a fabric pressing machine, cooperating pressing elements having an opening and closing movement, at least one of said elements being heated, a cabinet enclosing the machine, one of said elements being transferable out of and into the cabinet for placing the work on and removing the same therefrom, the cabinet being formed with an opening through which the transferable element moves into and out of the cabinet, mechanisms for supporting the said elements and for operating the press to open and close the same and actuating the transferable element out of and into the cabinet, operator controlled means common to said operating mechanisms, closure means operable in synchronism with the transferable element for closing the cabinet against outlet of air from within the cabinet when the transferable element is out of and in the cabinet, and means for maintaining a lower pressure within the cabinet than outside of the cabinet.

11. In a fabric pressing machine, cooperating pressing elements having an opening and closing movement, at least one of said elements being heated, a cabinet enclosing the machine, one of said elements being transferable out of and into the cabinet for placing the work on and removing the same therefrom, the cabinet being formed with an opening through which the transferable element moves into and out of the cabinet, mechanisms for supporting the said elements and for operating the press to open and close the same and actuating the transferable element out of and into the cabinet, operator controlled means common to said operating mechanisms, closure means operable in synchronism with the transferable element for closing the cabinet against outlet of air from within the cabinet when the transferable element is out of and in the cabinet, said closure means including a curtain connected to and operated by the transferable element into and out of position to open and close a portion of the cabinet when the transferable element is within the cabinet.

12. In a fabric pressing machine, cooperating pressing elements having an opening and closing movement, at least one of said elements being heated, a cabinet enclosing the machine, one of said elements being transferable out of and into the cabinet for placing the work on and removing the same therefrom, the cabinet being formed with an opening through which the transferable element moves into and out of the cabinet, mechanisms for supporting the said elements and for operating the press to open and close the same and actuating the transferable element out of and into the cabinet, operator controlled means common to said operating mechanisms, and closure means operable in synchronism with the transferable element for closing the cabinet against outlet of air from within the cabinet when the transferable element is out of and in the cabinet, said closure means including a curtain connected to and operated by the transferable element into and out of position to open and close a portion of the cabinet when the transferable element is within the cabinet, the transferable element having a part serving as a closure, when the transferable element is out of the cabinet, to close the space closed by the curtain when the transferable element is in the cabinet.

13. In a fabric pressing machine, upper and lower cooperating pressing elements having an opening and closing movement, at least one of said elements being heated, a cabinet enclosing the machine, the lower element being transferable out of and into the cabinet for placing the work on and removing the same therefrom, the cabinet being formed with an opening through which the transferable element moves into and out of the cabinet, mechanisms for supporting said elements and for operating the press to open and close the same and actuating the lower transferable element horizontally out of and into the cabinet, operator controlled means common to said operating mechanisms, and closure means operable in synchronism with the transferable element for closing the cabinet against outlet of air from within the cabinet when the transferable element is out of and in the cabinet, said closure means including horizontally and vertically extending closures, the horizontally extending closure being located under the transferable element and movable therewith during the transferring movement thereof into and out of closing position and the upright portion being mounted to move in synchronism with the transferable element out of and into open position during the movement of the transferable element out of and into the cabinet.

14. In a fabric pressing machine, upper and lower cooperating pressing elements having an opening and closing movement, at least one of said elements being heated, a cabinet enclosing the machine, the lower element being transferable horizontally out of and into the cabinet for placing the work on and removing the same therefrom, the cabinet being formed with an opening through which the transferable element moves into and out of the cabinet, mechanisms for supporting the said elements and for operating the press to open and close the same and actuating the transferable element out of and into the cabinet, operator controlled means common to said operating mechanisms, closure means including a horizontally extending curtain connected to and operated by the lower transferable element into and out of position to open and close a portion of the cabinet when the transferable element is within the cabinet, the transferable element having a table operating to close, when the transferable element is out of the cabinet, the opening of the cabinet closed by the curtain, when the transferable element is in the cabinet.

15. In a fabric pressing machine, upper and lower cooperating pressing elements having an opening and closing movement, at least one of said elements being heated, a cabinet enclosing the machine, the lower element being transferable out of and into the cabinet for placing the work on and removing the same therefrom, the cabinet being formed with an opening through which the transferable element moves into and out of the cabinet, mechanisms for supporting the said elements and for operating the press to open and close the same and actuating the lower transferable element horizontally out of and into the cabinet, operator controlled means common to said operating mechanisms, closure means operable in synchronism with the transferable element for closing the cabinet against outlet of air from within the cabinet when the transferable element is out of and in the cabinet, said closure means including horizontally and vertically extending closures, the horizontally extending closure being located under the transferable element and movable therewith during the transferring movement thereof into and out of closing position and the upright portion being mounted to move in synchronism with the transferable element out of and into open position during the movement of the transferable element out of and into the cabinet, and means for maintaining a lower atmospheric pressure within the cabinet than outside of the cabinet.

WALLACE F. GAYRING.